(12) United States Patent
Allen et al.

(10) Patent No.: US 8,806,142 B2
(45) Date of Patent: *Aug. 12, 2014

(54) ANTICIPATORY RESPONSE PRE-CACHING

(71) Applicant: Microsoft Corporation, Redmond, WA (US)

(72) Inventors: Nicholas Alexander Allen, Redmond, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,569

(22) Filed: Jun. 24, 2013

(65) Prior Publication Data

US 2013/0282986 A1 Oct. 24, 2013

Related U.S. Application Data

(63) Continuation of application No. 12/748,103, filed on Mar. 26, 2010, now Pat. No. 8,473,688.

(51) Int. Cl.
*G06F 12/10* (2006.01)

(52) U.S. Cl.
USPC ............... 711/137; 711/3; 711/118; 711/213

(58) Field of Classification Search
USPC ..................... 711/137, 3, 118, 213
See application file for complete search history.

(56) References Cited

U.S. PATENT DOCUMENTS

| | | | |
|---|---|---|---|
| 4,847,753 A | 7/1989 | Matsuo et al. | |
| 5,305,389 A | 4/1994 | Palmer | |
| 5,978,841 A | 11/1999 | Berger | |
| 6,047,363 A | 4/2000 | Lewchuk | |
| 6,073,168 A | 6/2000 | Mighdoll et al. | |
| 6,092,154 A | 7/2000 | Curtis et al. | |
| 6,393,526 B1 | 5/2002 | Crow et al. | |
| 6,473,832 B1 | 10/2002 | Ramagopal et al. | |

(Continued)

OTHER PUBLICATIONS

"WhatNext: A Prediction System for Web Requests Using N-Gram Sequence Models" Published Date: 2000 http://research.microsoft.com/pubs/68790/prediction_web_requests.pdf (8 pages) (The month of Publication is irrelevant since the year of Publication is clearly prior to the filing of the Application).

(Continued)

*Primary Examiner* — Jae Yu
(74) *Attorney, Agent, or Firm* — Ben Tabor; David Andrews; Micky Minhas

(57) ABSTRACT

Interaction between a client and a service in which the service responds to requests from the client. In addition to responding to specific client requests, the service also anticipates or speculates about what the client may request in the future. Rather than await the client request (that may or may not ultimately be made), the service provides the unrequested anticipatory data to the client in the same data stream as the response data that actual responds to the specific client requests. The client may then use the anticipatory data to fully or partially respond to future requests from the client, if the client does make the request anticipated by the service. Thus, in some cases, latency may be reduced when responding to requests in which anticipatory data has already been provided. The service may give priority to the actual requested data, and gives secondary priority to the anticipatory data.

20 Claims, 5 Drawing Sheets

(56) References Cited

U.S. PATENT DOCUMENTS

| | | |
|---|---|---|
| 6,539,382 B1 | 3/2003 | Byrne et al. |
| 6,574,618 B2 * | 6/2003 | Eylon et al. ............................ 1/1 |
| 6,742,033 B1 | 5/2004 | Smith et al. |
| 6,799,251 B1 | 9/2004 | Jacobs et al. |
| 6,931,588 B1 * | 8/2005 | Nakano ........................ 715/207 |
| 7,047,485 B1 | 5/2006 | Klein et al. |
| 8,291,007 B2 | 10/2012 | Orr et al. |
| 8,473,688 B2 | 6/2013 | Allen et al. |
| 2001/0034883 A1 * | 10/2001 | Zigmond ...................... 725/109 |
| 2002/0010761 A1 * | 1/2002 | Carneal et al. ................ 709/219 |
| 2002/0174303 A1 | 11/2002 | Gelman |
| 2004/0039878 A1 | 2/2004 | van de Waerdt |
| 2004/0059873 A1 | 3/2004 | Hum et al. |
| 2004/0123042 A1 | 6/2004 | Shafi et al. |
| 2007/0112973 A1 | 5/2007 | Harris et al. |
| 2013/0290469 A1 | 10/2013 | Allen et al. |

OTHER PUBLICATIONS

"A Markov Model for Web Request Prediction" Published Date: 2008, http://krex.k-state.edu/dspace/bitstream/2097/9191/1/HabelKurian2008.pdf, (58 pages) (The month of Publication is irrelevant since the year of Publication is clearly prior to the filing of the Application).

"Data Prefetching in the Era of Multicore Processors" Retrieved Date: Jan. 18, 2010, http://www.multicoreinfo.com/prefetching-multicore-processors/ (4 pages).

U.S. Appl. No. 12/748,103, Mar. 28, 2013, Notice of Allowance.

Office Action dated Dec. 5, 2013 cited in Application No. 13/925,504.

Notice of Allowance dated Jun. 3, 2014 in U.S. Appl. No. 13/925,504.

* cited by examiner

ANTICIPATORY RESPONSE PRE-CACHING

CROSS-REFERENCE TO RELATED APPLICATIONS

This application is a continuation of U.S. patent application Ser. No. 12/748,103 filed on Mar. 26, 2010, entitled "ANTICIPATORY RESPONSE PRE-CACHING," which issued as U.S. Pat. No. 8,473,688 on Jun. 25, 2013, and which application is expressly incorporated herein by reference in its entirety.

BACKGROUND

In networked computing systems, one computing system may make a request of another computing system. The time it takes from the time a computing system dispatches the request to the time that the computing system receives the response is referred to as "latency". The lower the latency, the greater the responsiveness.

Caching is an approach for improving responsiveness for a subset of such requests by servicing some requests using historical information. For example, a web browser may record pages previously visited. If the user browses to that web page while the page is still cached, the page may perhaps be drawn from the local cache, rather than having to re-request the page over a network. Such caches are in widespread use in modern networking systems. However, the efficacy of caches is primarily determined by a backward-looking model in which requests may be satisfied by information cached in response to prior requests.

Web browsers have recently introduced a non-standard "link prefetching" mechanism for speculatively retrieving resources in anticipation of future user requests. However, this form of precaching relies on the client to initiate the request and can only be performed for a constrained set of requests. For example, the client can only choose to pre-cache a fixed set of resources indicated in the response to the original request and must decide without further assistance whether speculatively performing these requests is safe (requesting a resource may for example undesirably change server state).

BRIEF SUMMARY

At least one embodiment described herein relates to an interaction between a client and a service in which the service responds to requests from the client. In addition to responding to specific client requests, the service also anticipates or speculates about what the client may request in the future. Rather than await the request that may or may not be made, the service provides the unrequested anticipatory data to the client in the same data stream as at least a portion of the responses to the specific client requests. The client may then use the anticipatory data to fully or partially respond to future requests from the client, if the client does make the request anticipated by the service. Thus, in some cases, latency may be reduced when responding to requests in which anticipatory data has already been provided.

In one embodiment, the service gives priority to the actual requested data, and gives secondary priority to the anticipatory data. That way, the actual client requests are not significantly delayed by the service providing anticipatory data to the client. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, an interaction between a client and a service is described in which the service not only responds to actual requests from the client, but also anticipates or speculates about what the client may request in the future. Rather than await the client's anticipated request (that may or may not ultimately be made), the service provides the unrequested anticipatory data to the client in the same data stream as at least one of the actual responses to the specific client requests. The client may then use the anticipatory data to fully or partially respond to future requests from the client, if the client does make the request anticipated by the service. Thus, in some cases, latency may be reduced when responding to requests in which anticipatory data has already been provided. First, some introductory discussion regarding computing systems will be described with respect to FIG. 1. Then, various embodiments of the client/service interaction will be described with reference to FIGS. 2 through 5.

Figure 1:
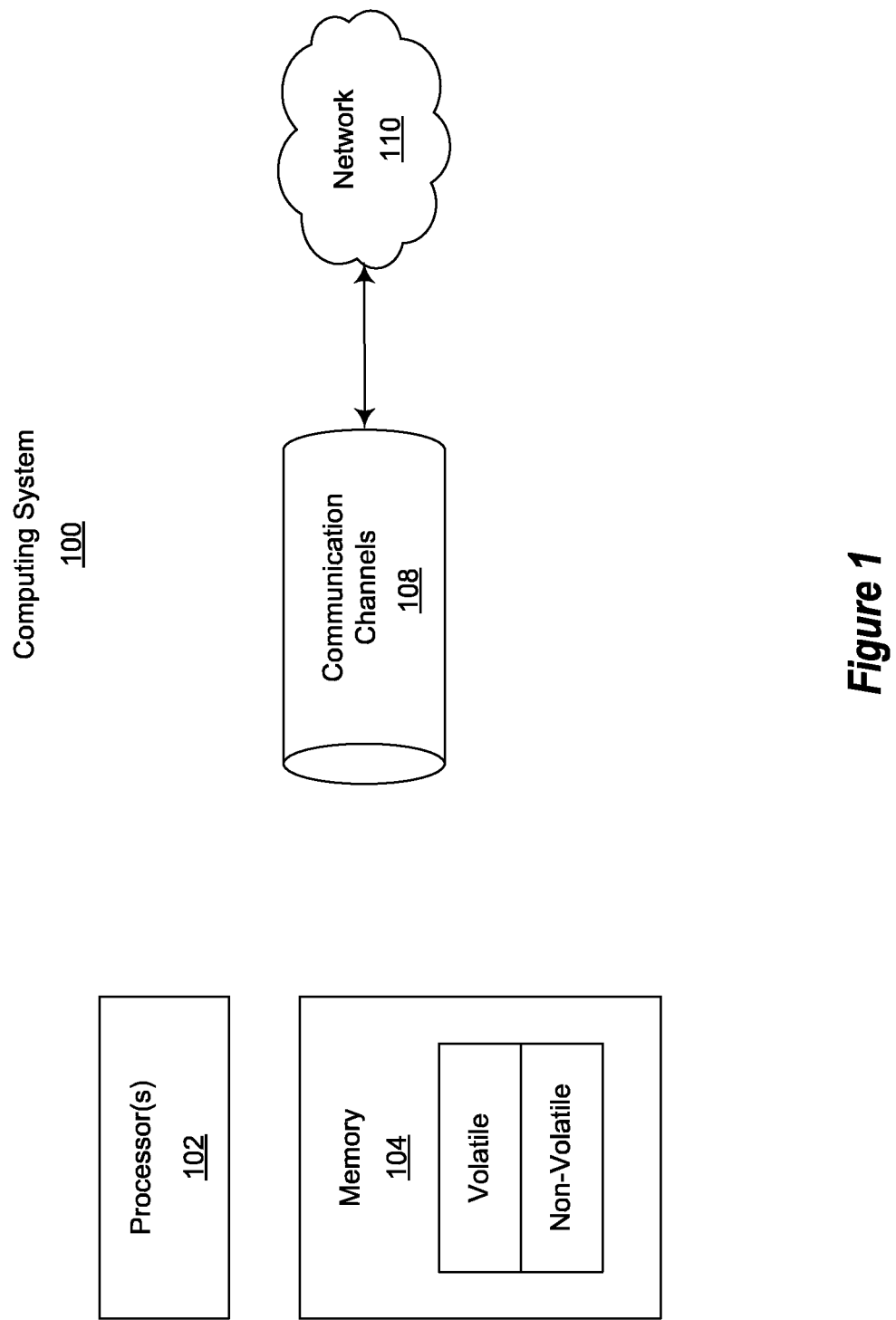
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such as structure may be a level and/or orientation of magnetism on the media at predetermined parts of the magnetic storage media. In the case of optical storage media, for example, such a structure may be a level of reflectivity of the media at particular predetermined parts of the optical media.

Figure 2:
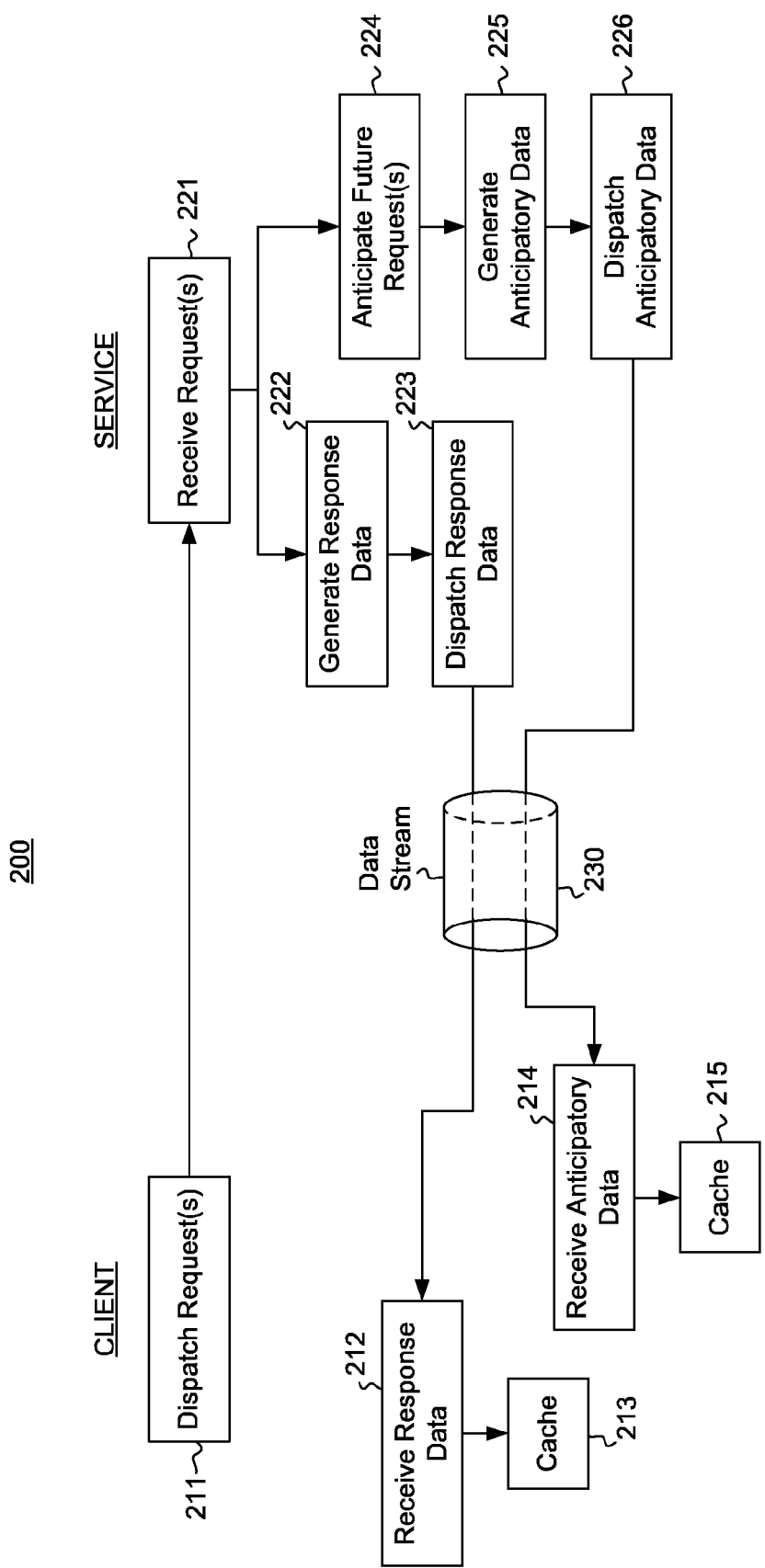
FIG. 2 depicts a flowchart of a method for a client and service to interact to thereby obtain pre-fetched or anticipatory data that is not responsive to a client request, but which is made in the service's anticipation of a future request.

FIG. 2 depicts a flowchart of a method 200 for a client and service to interact to thereby obtain pre-fetched or anticipatory data that is not responsive to a client request, but which is made in the service's anticipation of a future request. Should the client later make that future request while the anticipatory data is still cached, the locally cached anticipatory data may be used to generate a response to the client, rather than having to download again all of that anticipatory data. This has the potential to reduce response latency, especially in cases in which the service is quite accurate in predicting future client behavior. Furthermore, the actual response data and the anticipatory data may be provided by the service to the client over a single data stream while giving the actual response data priority over the anticipatory data, thereby reducing the overhead associated with getting the anticipatory data to the client.

Referring to the method 200 of FIG. 2, some of the acts of the method 200 are performed by the client computing system (or "client" for short) and are listed in the left column of FIG. 2 under the heading "client". Other acts are performed by the service that responds to client requests as represented in the right column of FIG. 2 under the heading "service".

The client interacts with the service by generating and dispatching one or more client requests to the service (act 211), and the service receives the request(s) (act 221) as each is dispatched from the client. In response to the requests, the service generates actual response data that is responsive to the one or more requests (act 222), which response data is provided to the client (act 223), whereupon the client receives the actual response data (act 212). This actual response data may be considered "historical response data" with respect to future client requests, since the historical response data was provided in response to the history of actual requests from the client to the server. The interaction may be a single request and a single response, or there may be multiple client requests and corresponding responses as part of the interaction. The historical response data may be cached (act 213) as it is received.

The service, however, does not just send the actual response data. Rather, the service also attempts to predict one or more future client requests (act 224). The service then generates anticipatory data (act 225) that would respond to such future client request(s), and likewise sends this anticipatory data to the client (act 226), even though not requested by the client. The client then receives the anticipatory data as well (act 214). In one embodiment, the anticipatory data is dispatched from the service to the client in the same data stream 230 as the actual response data. Once received by the client, the client may cache the anticipatory data (act 215).

As an example, suppose that the service is a data service that is offering up a list of ordered data items to the client. Now suppose the client has requested the first 10 data items in the list—items 1 through 10. The service may respond to the actual client request data with actual response data that is responsive to the request. Specifically, the service would provide the requested data items 1 through 10. However, the service may be aware that the client is likely viewing the data items in a scrollable window, and that a next possible action might be that the user scrolls down the list, or even pages down the list to the next 10 data items. If the user of the client does this, then that means that the client would request further data items above data item 10. Accordingly, rather than wait for that request, the service may provide data items 11 through 20 as well in the same data stream, but with a lower priority than the actual response data that included data items 1 through 10.

As another example, suppose the service is an image service that is offering up an image, perhaps a world topographical map, to the client. Now suppose the client begins the application by requesting a 1 mile scale topographical view centered at the user's residence. Accordingly, the client requests all of the image details necessary to render the 1 mile scale view of the user's residence. At this stage, the user of the client might do a number of things. For instance, the user might pan right, pan left, pan up, pan down, zoom in, zoom out, or view attractions in the viewed area. In anticipation of possible next requests, the service might download anticipatory data that anticipates one or more of these requests, and download the appropriate data that would allow the client to more immediately respond to the request.

The service could use statistical data from past behaviors of the user of the client, or may use statistical data regarding how users in general behave when encountering a similar situation. For instance, if based on this statistical data, the service determines that there is a 40% chance of the user zooming out, a 40% chance of the user zooming in, and less that a 10% chance of any other single action, perhaps the service downloads anticipatory data for a potential zooming out request, and anticipatory data for a potential zooming in request. However, the service could also decide that the less than 10% chance of a panning operation is an insufficient chance to warrant sending anticipatory data. The threshold may also depend on the current circumstances. For instance, perhaps the service would provide anticipatory data for panning operations if the data stream between the service and client were underutilized at that moment.

Figure 3:
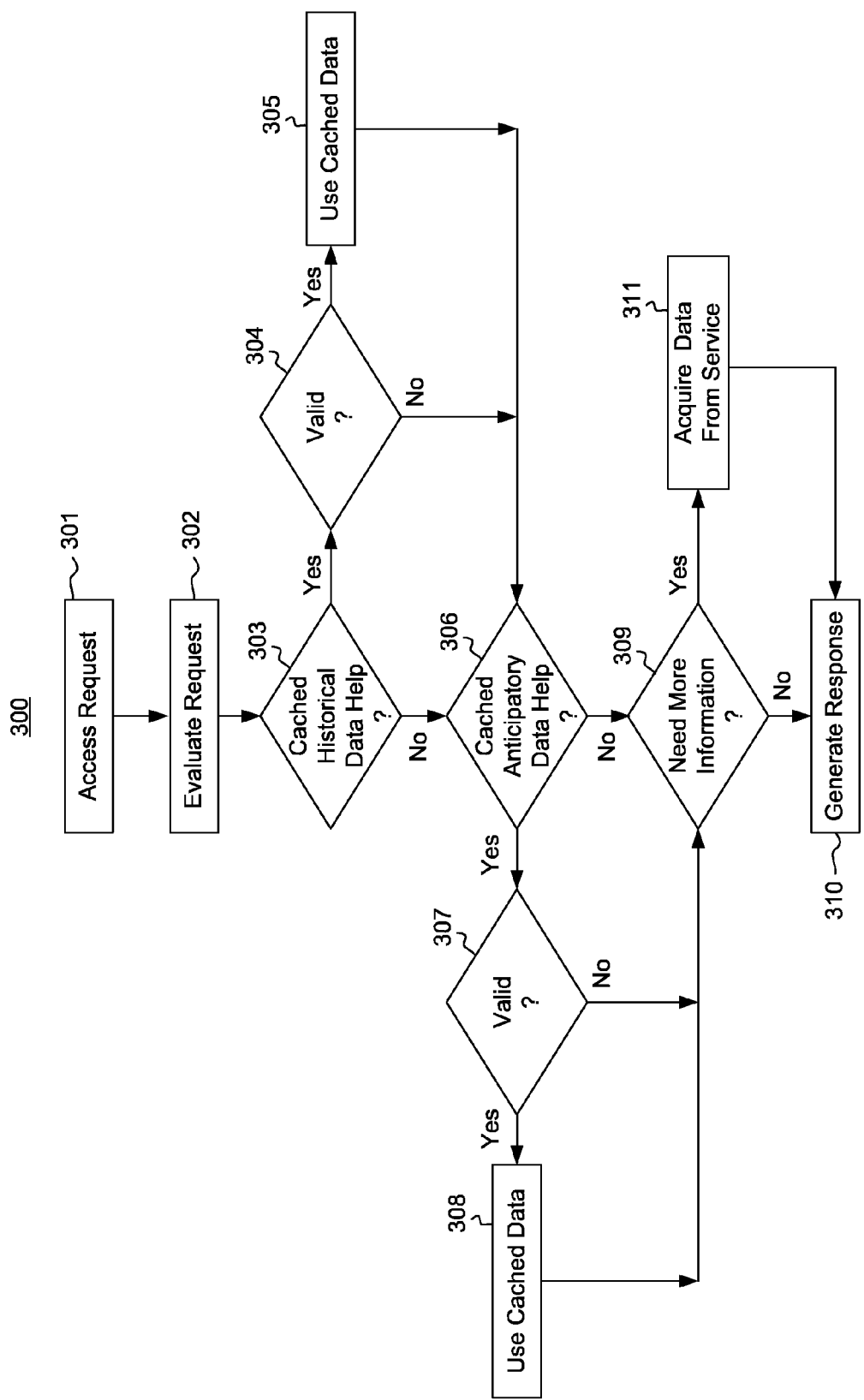
FIG. 3 is a flowchart of a method for the client to address future requests that are generated by the client.

After the interaction of FIG. 2, the client may potentially have one or both of historical response data and anticipatory data cached. FIG. 3 is a flowchart of a method 300 for the client to address future requests that are generated by the client. In some cases, the client may generate its own response to the client request based on the cached historical data and/or the cached anticipatory data. The method 300 is performed each time a client request is made. For the initial client request, there might perhaps be no cached historical response data, nor any anticipatory data. However, as more and more requests are made, the cached historical response data and/or the cached anticipatory data might accumulate.

The method 300 is initiated when the client accesses a request for the service (act 301). The client itself evaluates the client request (act 302). The client determines based on this evaluation whether any of the cached historical response data will assist in formulating a response to the request (decision block 303). If the cached historical response data will help (Yes in decision block 303), then the client may validate whether the historical response data is still valid (decision block 304). The client may do this by either communicating with the service, or enforcing some other validity determination mechanism understood by the client and service. If the historical data is still valid (Yes in decision block 304), then that validated historical data may be used to formulate at least a portion of a response to the request (act 305).

In any case, the method 300 then determines whether any of the cached anticipatory data may help to satisfy at least a portion of the request (decision block 306). If the cached anticipatory data will help (Yes in decision block 306), then the client may validate whether the anticipatory data is still valid (decision block 307). The client may do this by either communicating with the service, or enforcing some other validity determination mechanism understood by the client and service. In one case, if the service causes the client to delete anticipatory data that is no longer valid from its cache, then the client can more safely assume that any anticipatory data that is still cached is then valid. At least in that case, a separate determination regarding validity need not be made. If the anticipatory data is still valid (Yes in decision block 307), then the anticipatory data may be used to formulate at least a portion of a response to the request (act 308).

At this stage, the client has obtained as much information from the cached historical response data and the cached anticipatory data as the client is going to perform to generate its own portion of the response. If the cached data was sufficient to generate the entire response to the client request (No in decision block 309), then the client generates the response to the client request (act 310), without having to request any additional data from the service. If the cached data was not sufficient to generate the entire response to the client request (Yes in decision block 309), then the client issues a request for that data that the client was not able to acquire from the client's cache (act 311). Specifically, the client requests from the service new response data that, in conjunction with the at least a portion of the cached anticipatory data and/or in conjunction with the cached historical response data, acts to be entirely sufficient to provide a complete response to the client request. Upon receiving such new data, the client can generate the response (act 310).

Note that the request for the additional data from the service represents an additional opportunity for the service to predict other future requests, and thereby provide further anticipatory data in the same data stream as the response to the actual request. Furthermore, if the service determines that some of the anticipatory data previously provided to the client is outdated by either the request, or other intervening events, then the service may provide control instructions to alter or delete the previously provided anticipatory data.

A few examples will now be provided extending from one of the examples provided above. Assume that the client had historically made two requests to the service: a first request for data items 1 through 10, and then in response to a page down at the client, a second request for data items 11 through 20. Then suppose that, although not requested, data items 21 through 25 were also provided as anticipatory data.

Now suppose the client jumps to data items 101 through 110. This is a case where there just happens to be no cached historical response data (i.e., data items 1 through 20), nor any cached anticipatory response data (i.e., data items 21 through 25) that will be of assistance in generating the response. Accordingly, the client will just simply request data items 101 through 110 from the service.

Now suppose that instead of jumping to data items 101 through 110, the client instead scrolls back up to data items 5 through 14. In this case, it turns out that the cached historical response data (i.e., data items 1 through 20) will be entirely sufficient to generate the client response without having to download the data items 5 through 14 again from the service, provided that data items 5 through 14 are still valid.

As a third example, suppose that the user were to scroll down to data items 15-24. In this case, the client request may be satisfied partly by historical response data (for data items 15 through 20), and partly by anticipatory data (for data items 21 through 24).

As a final example, as before, assume the situation in which data items 1 through 20 are cached historical response data, and data items 21 through 25 are cached anticipatory data. Now suppose the user scrolls to data items 18-27. In this situation, the data items 18 through 20 can be satisfied from the cached historical response data, and the data items 21 through 25 can be satisfied from the cached anticipatory data. However, that still leaves data items 26 and 27 lacking. Accordingly, instead of requesting data items 18 through 27 from the service, the client instead can just request data items 26 and 27.

Figure 4:
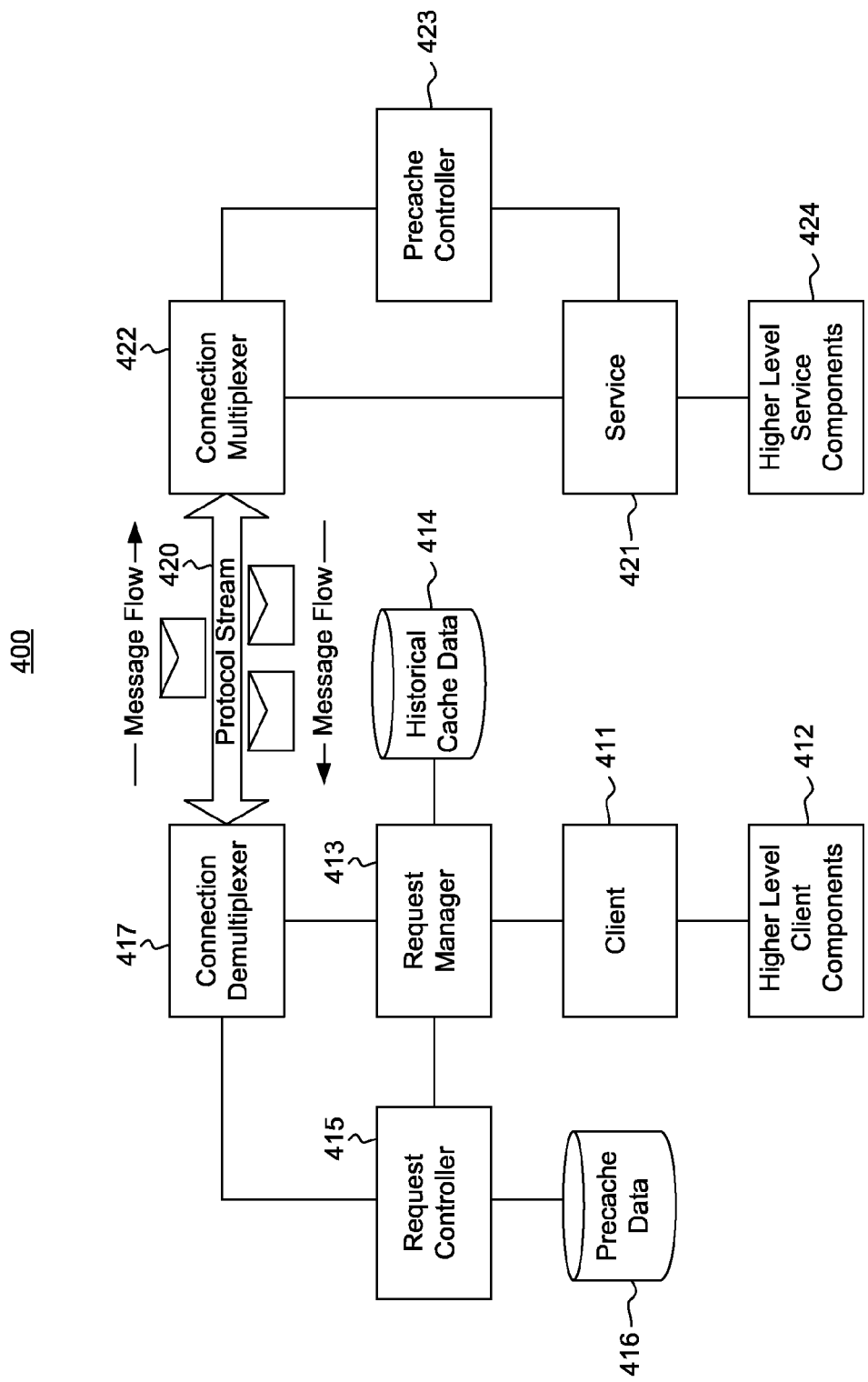
FIG. 4 illustrates a client-service architecture that may be used consistent with the principles described herein.

FIG. 4 illustrates a client-service architecture 400 that may be used consistent with the principles described herein. The architecture 400 is just an example only. The various illustrated components may be separate modules, but they may also be just functional, and not related to any sort of module boundary whatsoever. The function of the various components of the architecture 400 will now be described.

A client component 411 is the client that generates the original client request, and expects a response to that client request. For example, the client request might be a request for data items 18 through 27, as in the above-example. The client 411 may optionally interact with higher-level client components 412, the interaction causing the client to submit the request for data items 18 through 27. As an example, the higher level client components 412 may be anything that interacts with the client 411 such as, for example, a user or another module or component.

A request manager component 413 provides an application response for each submitted application request. For example, the request manager 413 component may respond to a client request from the client 411 for data items 18 through 27 by actually providing data items 18 through 27 in response, which is just what the client component 411 was expecting.

A historical cached data component 414 stores historical information about application requests and responses. In this example, suppose that the client 411 has made two prior requests from the service, one request for data items 1 through 10, and another request for data items 11 through 20. In that case, the historical cached data component 414 may have cached versions of data items 1 through 20.

A request controller component 415 produces an application response or portion of a response from anticipatory precached data and control instructions.

A precache data component 416 stores anticipatory data provided by the service 421 for servicing future application requests. In the example, suppose the precache data component 416 caches data items 21 through 25, even though such data items had not previously been requested by the client 411. Thus, in the example discussed hereinafter, the historical cached data 414 includes data items 1 through 20, while the precache data component 416 includes data items 21 through 25.

A connection demultiplexer component 417 separates anticipatory data and control instructions from actual application responses on a protocol stream 420.

The issuing of application requests will now be described. The client 411 formulates an application request it wishes to have processed by the service 421. For instance, in the example, the client 411 requests data items 18 through 27. The client 411 then sends the client request to the request manager 413.

The request manager 413 attempts to provide an application response using historical data, potentially by accessing the historical cached data component 414. If the request manager 413 is able to supply an application response, then the request manager 413 provides the application response, and then processing for that client request is completed. For example, suppose that the client request were for data items 5 through 14. Those data items are all cached in historical cached data component 414. Thus, the request manager 413 would, in that case, after validating that the cached items 5 through 14 are still current (through perhaps a brief communication with the service 421), be able to provide a complete response to the request.

However, in the example case in which the client request is for data items 18 through 27, the request manager 413 cannot generate a complete response to the client request. Accordingly, in this embodiment, the request manager 413 passes the client request to a request controller 415 along with data items 18 through 20, which the request manager 413 was able to obtain from the historical cache data component 414.

The request controller 415 accesses the precache data component 416 to acquire any precached data that may be used to supply a response. For instance, in the example, the precached anticipatory data items 21 through 25 may all be used, in conjunction with the data items 18 through 20, to provide a portion of the response. All that remains to be acquired is data items 26 and 27. The service may occasionally send control instructions to the precache data component 416. For instance, if data item 24 had changed at the service, the service might instruct that the precached data item 24 is no longer valid. In that case, the request controller 415 would acquire data items 24, 26 and 27 from the service.

The request controller 415 consults with the service 421 to complete the remainder of processing to produce the application response. For instance, in this example, the request controller 415 would issue a request for data items 26 and 27 (and also data item 24 if there was a control instruction indicating that the previously precached data item 24 was no longer valid). If the precache data component 416 did not precache data items 21 through 25, then the request controller 415 would instead request data items 21 through 27 from the service 421.

A protocol stream component 420 provides a bidirectional ordered sequence of bytes over a communication medium. The connection multiplexer component 422 combines precache data (also referred to herein as anticipatory data) and control instructions with actual application responses on the protocol stream 420.

A precache controller component 423 produces precache data and control instructions responsive to application requests and responses that are being exchanged A service component 421 processes the actual application requests and formulates application responses. In the example, the service component 421 would receive the application request for data items 26 and 27 generated and dispatched by the request controller 415.

Higher level service components 424 may interact with the service component 421 to help process application requests and formulate application responses.

The issuing of application responses will now be described. The service component 421 receives an application request the client component 415 wishes to have processed and processes the request to produce an application response. In this example, the service component 421 receives the application request for data items 26 and 27, and generates a response that includes data items 26 and 27.

The service component 421 then sends the application response to the connection multiplexer component 422. The service component 421 also sends the application request and response to the precache controller component 423.

The precache controller 423 examines the application request and response to determine if the client should receive speculative or anticipatory data or should receive adjustments to previously issued speculative data. For instance, in this case, the precache controller 423 might decide that data items 28 through 37 should also be provided to the precache data component 416 as anticipatory data after anticipating that the client might soon request such additional data items.

The precache controller 423 sends one or more precache data and precache control messages to the connection multiplexer 422. For instance, in this case, the precache controller 423 might send anticipatory data items 28 through 37 to the connection multiplexer 422. Additionally, the precache controller 423 might send control instructions as well. For instance, such control instructions might instruct for some of the anticipatory data to be rechararacterized as historical data, might invalidate some anticipatory data previously downloaded to the client, or might invalidate some historical response data previously downloaded to the client.

The connection multiplexer 422 maintains a prioritized queue of application response, precache data, and precache control messages to send, periodically transmitting messages from the queue over the protocol stream 422. The connection multiplexer 422 fragments a message into one or more communication frames for transmission, and encodes each communication frame into a byte sequence to be appended to the protocol stream. The connection multiplexer 422 selects a next communication frame to transmit based on the priority of the message that generated the frame.

The connection demultiplexer 417 receives actual responses, precache data, and precache control messages. The connection demultiplexer 417 pulls bytes from the protocol stream 420 until the sequence of bytes makes up a recognizable communication frame. The connection demultiplexer 417 assembles communication frames to reconstruct the original message, and then routes application responses to the request manager 413 and precache data and control messages to the request controller 415. For instance, in the example, the response includes data items 26 and 27, which are routed to the request controller 415 whereupon the request controller 415 may formulate an entire response to the client request including data items 18 through 27. Additionally, the request controller 415 receives anticipatory data items 28 through 37, which are cached in the precache data component 416 in anticipation of future client requests. Finally, the request controller 415 may receive control instructions from the connection demultiplexer 417, and respond accordingly. For instance, in response to a control instruction to delete a data item from the anticipatory data, the request controller 415 performs the deletion.

Figure 5:
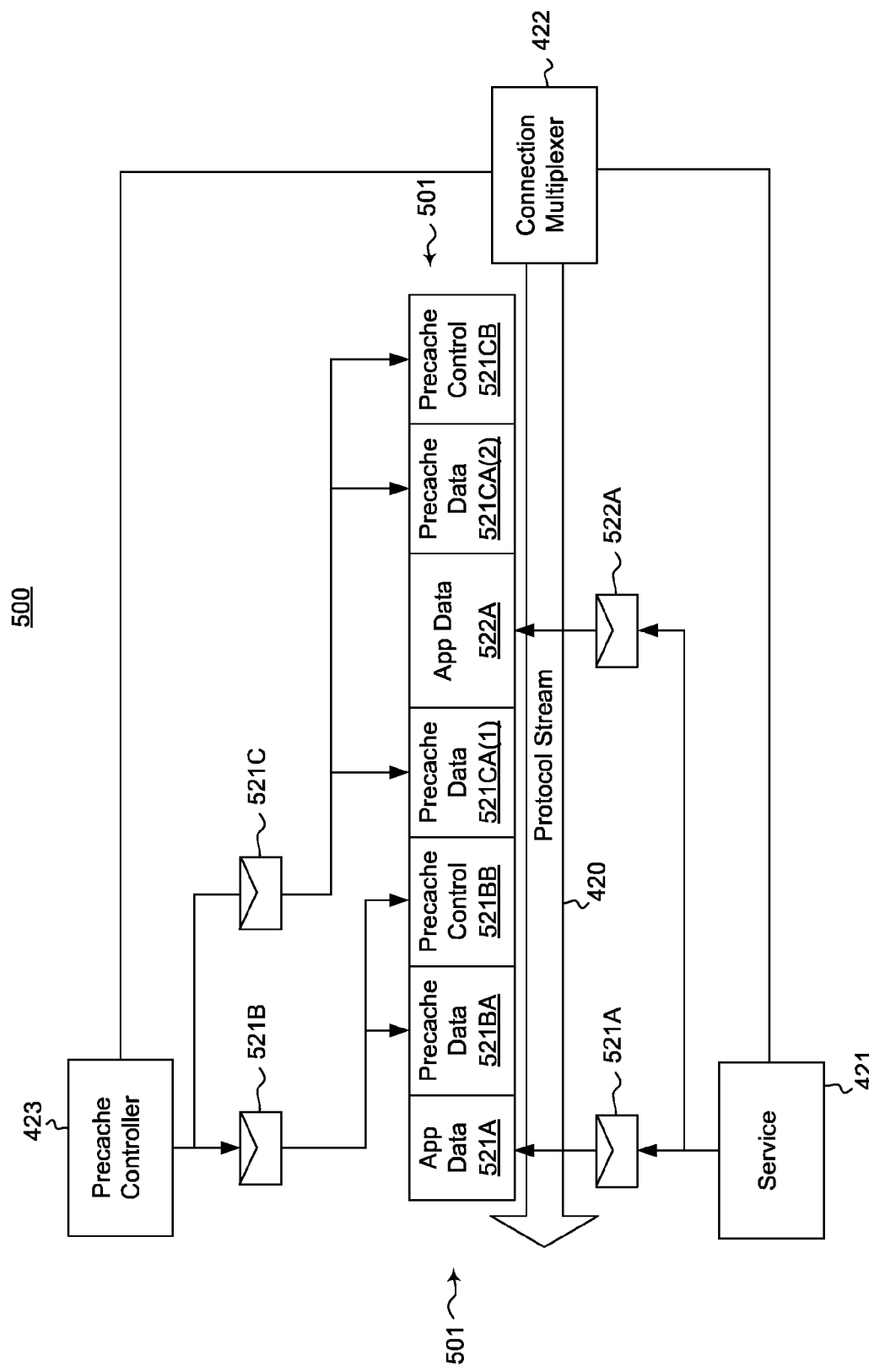
FIG. 5 illustrates a queue environment in which a queue has various frames that are ready to be dispatched from the service.

FIG. 5 illustrates a queue environment 500 in which a queue 501 has various frames that are ready to be dispatched from the service. The environment 500 includes a queue 501 with the service 421, the connection multiplexer 422, and the precache controller 423 interacting therewith. FIG. 5 shows an example of multiplexing application responses with precaching using three types of frames: application data frames, precaching data frames, and precaching control instruction frames.

In response to a first application request, the service 421 transmits a first application response 521A and the precache controller 423 transmits a first precache response 521B and 521C. Each precache response comprises precache data (or anticipatory data) and a control message. For instance, first precache response 521B included first precache data 521BA and first control message 521BB. The second precache response 521C includes second precache data 521CA and second control message 521CB. In FIG. 5, ignore the fact for now that application response 522A intervenes between a first portion 521CA(1) of the second precache data 521CA and a second portion 521CA(2) of the second precache data 521CA. Thus, up to now, the following data is in the queue in the following priority order: 1) the first application response 521A, 2) the first precache data 521BA, 3) the first control message 521BB, 4) the second precache data 521CA, and 5) the second control message 521CB.

The connection multiplexer 422 segments the first application response 521A into one or more application data frames and transmits them. The connection multiplexer 422 then segments the first precache data 521BA into one or more precaching data frames and transmits them. The connection multiplexer 422 then segments the first control message 521BB into one or more control message frames and transmits them. The connection multiplexer 422 then segments a first portion 521CA(1) of the precache data 521CA into one or more precaching data frames and transmits them.

After transmitting the portion 521CA(1) of the precaching data frames for the second precache data 521CA, the connection multiplexer 422 receives a second application response 522A from the service. The connection multiplexer 422 prioritizes the second application response 522A ahead of the remaining portion 521CA(2) of the precache data 521CA.

The connection multiplexer 422 segments the second application response 522A into one or more application data frames and transmits them. The connection multiplexer then resumes transmission of precaching data frames 521CA(2) and precaching control message frames 521 CB for the second precache response 521C.

The connection multiplexer 422 may throttle the protocol stream 420 by refraining from transmitting communication frames even when the protocol stream 420 is idle. For example, the service 421 may be configured to not transmit precache responses when more than half of the protocol stream 420 bandwidth is being used. As another example, the service 421 may be configured to not transmit more than a certain number of bytes of precache responses, or perhaps no precache responses at all, for a particular client.

The configuration of the connection multiplexer may come from the server administrator or, for the particular connection, from the client. For example, the request controller 415 may send control instructions to the connection multiplexer 422 and precache controller 423 informing them that the client wishes to place limits on the use of precache responses or wishes the service to transmit precache responses more slowly or less often. The client may wish to limit the use of precaching because, for example, the client is charged by the byte for network traffic and thus values minimizing the amount of data exchanged over reducing request latency even when bandwidth is available.

Processing of the second application request may have affected the previously enqueued second precache response. For example, the second application request may have been the application request that the second precache response was created in anticipation of. In addition to sending precache responses, the precache controller may send control instructions for prior precache responses. The precache controller may send a discard instruction for a portion of the second precache response as that content was transmitted with the second application response.

The connection multiplexer may apply control instructions to its current state, for example by discarding untransmitted communication frames that are no longer needed, or by sending the control instructions to the client, for example to inform the client that a portion of the precache data it may be storing is no longer useful and may be discarded.

By giving the actual response priority over anticipatory data and control instructions, the actual response data is not significantly delayed while still allowing anticipatory data to be provided when the protocol stream is available. Actual response data is given priority in the queue and jumps ahead of any anticipatory data and/or control instructions in the queue.

Accordingly, the principles described herein permit services to provide anticipatory data to a client with low impact on response times for actually requested data. When future requests are made, there is increased chance that the data is already available at the client, thereby potentially reducing response latency in cases where future requests are accurately anticipated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. One or more computer-readable storage device having stored computer-executable instructions that, when executed by one or more processors of a computing system, cause the computing system to obtain unrequested pre-fetched data in anticipation of one or more future client requests by implementing a method that includes:
   an act of identifying one or more client requests;
   in response to the one or more client requests, an act of generating response data that is responsive to the one or more client requests;
   an act of providing the response data to the client;
   an act of attempting to predict a future client request for an anticipated predetermined situation, wherein said attempting to predict the future client request includes distinguishing between different past behaviors of the client to predict how the client is likely to behave when encountering the anticipated predetermined situation; and
   an act of generating anticipatory data that is responsive to the predicted future client request for the anticipated predetermined situation without being directly responsive to the one or more client requests.

2. The one or more computer-readable storage device of claim 1, wherein the generated anticipatory data is used to at least partially satisfy one or more future client requests.

3. The one or more computer-readable storage device of claim 1, wherein the method further includes providing the generated anticipatory data to the client.

4. The one or more computer-readable storage device of claim 3, wherein the method further includes providing the generated anticipatory data to the client prior to the client accessing the one or more future client requests.

5. The one or more computer-readable storage device of claim 4, wherein the one or more future client requests is at least partially satisfied by the client using the generated anticipatory data without sending the one or more future client requests to the computing system.

6. The one or more computer-readable storage device of claim 3, wherein the generated response data and the generated anticipatory data are both provided to the client in a single data stream.

7. The one or more computer-readable storage device of claim 6, wherein the generated response data is given priority over the generated anticipatory data, and such that providing the generated response data and the generated anticipatory data compromise the following:
   an act of generating a first portion of the generated response data in response to a first client request;
   an act of generating a first portion of the anticipatory data in response to the first client request;
   an act of inserting the first portion of the generated response data in a transmission queue corresponding to the data stream, and inserting the first portion of the generated anticipatory data in the transmission queue after the first portion of the generated anticipatory data; and
   an act of beginning to provide the data from the transmission queue to the client by first transmitting the first portion of the generated response data to the client.

8. The one or more computer-readable storage device of claim 1, wherein the act of attempting to predict future client request is performed using one or more client requests received from the client.

9. A computing system comprising:
   at least one processor; and
   at least one computer-readable storage medium having stored computer-executable instructions that, when executed by one or more processors of a computing system, cause the computing system to obtain unrequested pre-fetched data in anticipation of one or more future client requests by implementing a method that includes:
   an act of identifying one or more client requests;
   in response to the one or more client requests, an act of generating response data that is responsive to the one or more client requests;
   an act of providing the response data to the client;
   an act of attempting to predict a future client request for an anticipated predetermined situation, wherein said attempting to predict the future client request includes distinguishing between different past behaviors of the client to predict how the client is likely to behave when encountering the anticipated predetermined situation; and
   an act of generating anticipatory data that is responsive to the predicted future client request without being directly responsive to the one or more client requests.

10. The computing system of claim 9, wherein the act of attempting to predict future client request is performed using statistical analysis of the different past behaviors of the client.

11. The computing system of claim 10, wherein the different past behaviors of the client includes user interaction with displayed data.

12. The computing system of claim 9, wherein the method further includes providing the generated anticipatory data to the client and wherein the generated anticipatory data is only transmitted to the client in response to detecting underutilization of a data stream between the client and the computing system, the underutilization of the data stream comprising a certain percentage of bandwidth of the data stream being unused.

13. The computing system of claim 9, wherein the method further includes providing the generated anticipatory data to the client and wherein one or more portions of the generated anticipatory data are transmitted to the client each time a client request is received.

14. The computing system of claim 9, wherein the method further includes providing the generated anticipatory data to the client and wherein one or more portions of the generated anticipatory data are transmitted to the client each time response data is transmitted to the client responsive to the one or more client requests.

15. The computing system of claim 9, wherein the act of attempting to predict future client request is performed using the one or more client requests received from the client.

16. The computing system of claim 9, wherein the method further includes providing the generated anticipatory data to the client, but wherein the generated response data is given priority over the generated anticipatory data.

17. A computer-implemented method for obtain unrequested pre-fetched data in anticipation of one or more future client requests, the method comprising:
 an act of a computing system identifying one or more client requests, the computing system including at least one processor;
 in response to the one or more client requests, an act of the computing system generating response data that is responsive to the one or more client requests;
 an act of the computing system providing the response data to the client;
 an act of the computing system attempting to predict a future client request for an anticipated predetermined situation, wherein said attempting to predict the future client request includes distinguishing between different past behaviors of the client to predict how the client is likely to behave when encountering the anticipated predetermined situation; and
 an act of the computing system generating anticipatory data that is responsive to the predicted future client request without being directly responsive to the one or more client requests.

18. The method of claim 17, wherein the method further includes providing the generated anticipatory data to the client.

19. The method of claim 18, wherein one or more future client requests corresponding to the predicted future client request is processed by and at least partially satisfied by the client using the generated anticipatory data without sending the one or more future client requests to the computing system.

20. The method of claim 17, wherein the generated response data and the generated anticipatory data are both provided to the client in a single data stream with the generated response data being given transmission priority over the generated anticipatory data.

* * * * *